United States Patent [19]

Rosenbaum et al.

[11] Patent Number: 5,103,387
[45] Date of Patent: Apr. 7, 1992

[54] HIGH VOLTAGE CONVERTER

[75] Inventors: Stanley D. Rosenbaum, Ottawa; Donald S. McGinn, Almonte; Brian A. F. S. Sutherland, Kanata, all of Canada

[73] Assignee: Northern Telecom Limited, Montreal, Canada

[21] Appl. No.: 648,776

[22] Filed: Jan. 31, 1991

[51] Int. Cl.⁵ .......................................... H02M 3/335
[52] U.S. Cl. ...................................... 363/21; 363/127; 307/86
[58] Field of Search .................. 363/16, 17, 20, 21, 363/89, 97, 127; 323/271, 272; 307/46, 66, 86, 72

[56] References Cited

U.S. PATENT DOCUMENTS

| | | |
|---|---|---|
| 4,056,689 | 11/1977 | Freimanis . |
| 4,399,499 | 8/1983 | Butcher et al. ................... 363/17 |
| 4,674,119 | 6/1987 | Chea, Jr. . |
| 4,713,838 | 12/1987 | Rosenbaum et al. . |
| 4,716,514 | 12/1987 | Patel ................................. 363/127 |
| 4,761,812 | 8/1988 | Hollis et al. . |
| 4,816,739 | 3/1989 | Sakurai et al. ................... 323/272 |
| 4,882,664 | 11/1989 | Pennington ...................... 363/127 |
| 4,945,465 | 7/1990 | Marinus et al. ................... 363/89 |

Primary Examiner—Peter S. Wong
Attorney, Agent, or Firm—Yoshiharu Toyooka

[57] ABSTRACT

High voltage converters are disclosed. The converters include at least a pair of transistor switches provided on the secondary windings of a flyback transformer. The transistor switches are controlled to be conducting, variably conducting and non-conducting so that the power flow between the transformer and a load can be controlled. Various configurations of a connection switch network are also disclosed.

11 Claims, 8 Drawing Sheets

HIGH VOLTAGE CONVERTER

FIELD OF THE INVENTION

The present invention relates to a high voltage converter for providing a load with an AC power of the desired waveform in which charging and discharging of the power to and from the load is controlled. More specifically, the invention is directed to the high voltage converter used in a system where controlled DC power, AC power and a combination of both are required for its operation. As one of the preferred embodiments, the system to which the present invention can be applied is the telephone system where controlled DC and/or AC voltage higher than a DC source voltage provided in the system is required for certain telephony functions.

BACKGROUND OF THE INVENTION

In the field of telephony, it has historically been considered to be too costly to provide high voltage signalling, such as ringing and coin telephone control, on a per-line basis. Instead, these functions have usually been provided by common generators. Each generator serves a number of lines, being switched onto each line when required, by a relay on the line circuit. However, this approach does have drawbacks, as will be described below, and does not easily extend to other forms of high voltage signalling, such as message waiting. As further requirements, to reduce impulse noise while ringing, the relay movement should be timed to coincide with a "zero crossing" of the ringing AC waveform. Also, party lines may require "selective ringing", involving: (a) providing the ringing voltage to one or other side of the line, relative to ground; (b) superimposing either a negative or a positive DC voltage onto the AC ringing voltage; (c) ringing at different frequencies. Due to the burden of providing the correct type of signal to each line as required, without overloading the generators when traffic is high, there can be significant time delay in providing signalling operations, so it is not possible to guarantee a desirable "immediate ring" feature. For message waiting signalling it is essential that the voltage be applied and removed slowly, in order to avoid sounding the subscriber's ringers. Also, the maximum current delivered to each line should be limited for safety reasons not to exceed a few milliamperes. These special requirements are additional to those providing ringing or coin operation, further increasing the cost.

Electronic techniques for supplying DC and AC power to a telephone line or other load line are well known. One reason for using electronic means for supplying DC power is to reduce heat dissipation within the line circuit. Heat dissipation can be further reduced by adjusting the voltage of the DC supply in accordance with the line resistance. Since line resistances differ, preferably this is done by providing efficient power conversion for each line individually.

U.S. Pat. No. 4,761,812 issued August 1988 (Hollis el al), teaches a constant power telephone line circuit. It comprises a flyback switching power converter having a switching transistor circuit, a transformer having a primary winding coupled to the switching transistor circuit and device for discharging energy stored in the core such that the power output is a constant power pulse. U.S. Pat. No. 4,674,119, issued June 16, 1987 (Chea, Jr.), describes a wide band high voltage amplifier for telephony. It also uses a flyback generator with a capacitor storage element coupled across the line and an error signal controls the energy transfer from the flyback converter to the line. U.S. Pat. No. 4,056,689, issued Nov. 1, 1977 (Freimanis), on the other hand, describes a communication line interface circuit including a floating current source supplying a constant current substantially independent of loop length. The line interface circuit is provided with circuitry for line supervision and the detection of dial pulse signalling.

A need therefore exists for an efficient power converter not only for the telephone system but also for systems where precise control of power flow into and out of a load is required. For example, such converters are useful in the field of motor control of computer tape drives, and of read/write heads in computer disk drives, which are required to have rapid starting, stopping, and reversing characteristics.

In telephony, the converter should be able to supply DC power of an adjustable voltage for providing balanced line feed for the idle, addressing and transmission states of the line. It should also be able to supply AC power of a desired waveform at voltages higher than the DC source voltage. A voltage higher than a DC source is used if, for example, it should happen that the DC source voltage typically from a battery is unusually low. A voltage lower than the DC source might be used when the line resistance is less than the normal maximum. The converter can alternatively supply signalling power to one or the other side, or both sides, of the line, when the situation requires voltages higher than or of the opposite polarity from that of the DC source. These situations include ringing, coin telephone signalling and control, and message-waiting signalling.

OBJECTS OF THE INVENTION

It is therefore an object of the present invention to provide a high voltage converter which is able to control the flow of the power to and from the load.

It is another object of the present invention to provide a high voltage converter which is able to connect selectively on demand a line driver circuit or a high voltage circuit to the load.

It is still a further object of the present invention to provide a high voltage converter which includes a connection switch network in a more efficient switch configuration.

SUMMARY OF THE INVENTION

Briefly stated, the present invention relates to a high voltage converter for providing a power to a load by load connection lines from a DC voltage source. The converter comprises a line driver circuit means to be connected to the DC voltage source for providing a line drive output and high voltage circuit means to be connected to the DC voltage source for providing a high voltage output. It further includes connection switch means for selectively connecting the line driver circuit means and the high voltage circuit means to the load connection lines for providing the line drive output, the high voltage output or a combination thereof. The high voltage circuit means in turn comprises a flyback transformer which has a primary winding and two secondary windings. The high voltage circuit means further includes a primary transistor switch connected to the primary winding for supplying the pulsed power thereto from the DC voltage source in a controlled pulsing manner and a secondary transistor switch and diode combination connected to each of the two secondary windings for controlling the flow of the power generated therein as the result of the power supplied to the primary winding. Each of the secondary transistor switches is turned on or off in a controlled manner so that a high voltage output of a specific waveform is produced.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS

Figure 1:
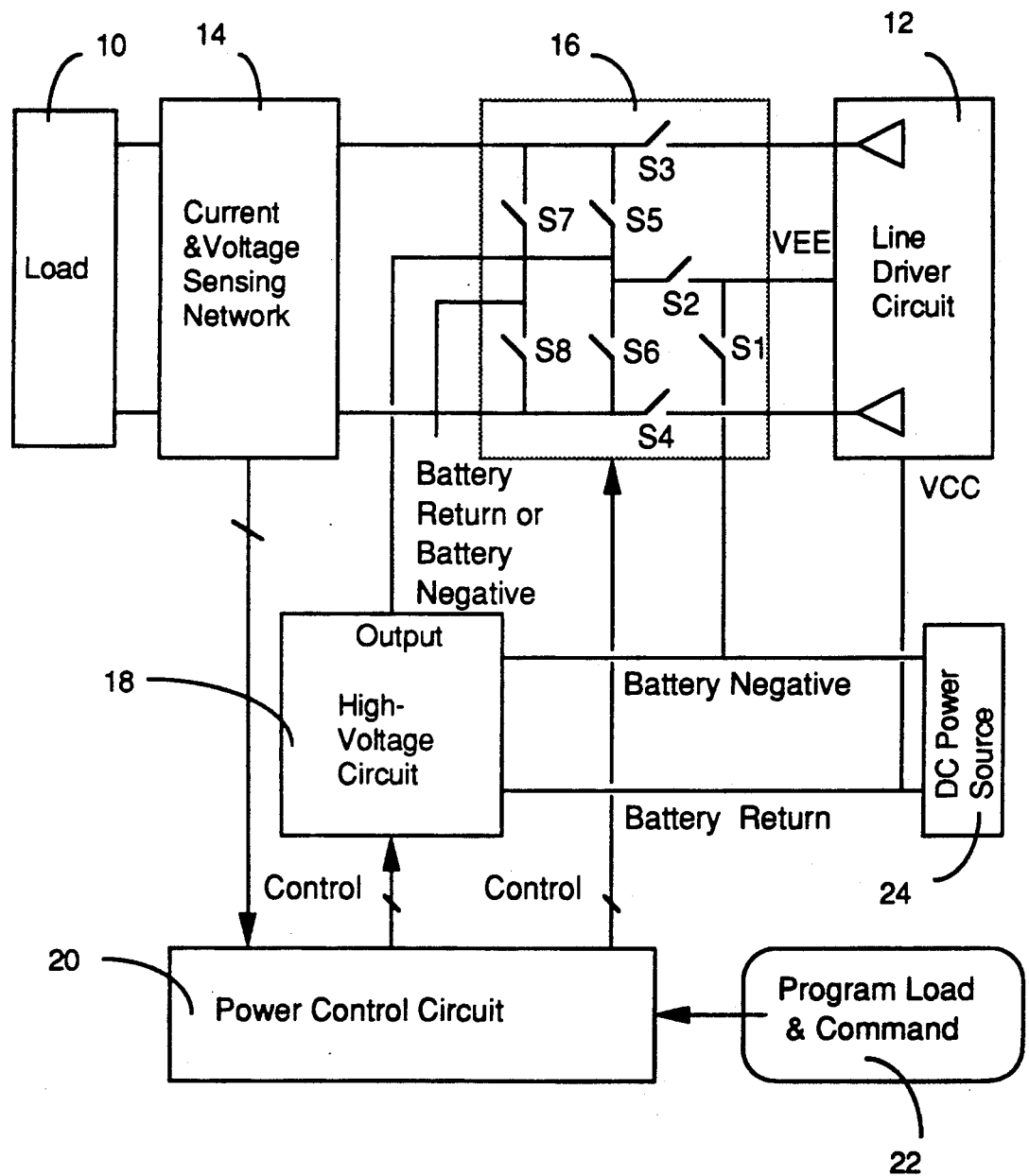
FIG. 1 is a schematic block diagram of the high voltage converter according to one embodiment of the invention.

FIG. 1 shows in a schematic block diagram the high voltage converter system according to one embodiment of the present invention. In the figure a load 10 is supplied with a controlled power by load connection lines which may be four lines in simplex configuration in other embodiments. A line driver circuit means 12 provides various controlled DC power or AC of a desired waveform, or a combination of both to its output terminals which are connected to a current and voltage sensing network 14 via connection switch network 16 consisting of a plurality of switches $S_1, S_2, S_3 \ldots$ A high voltage circuit means 18 produces a high voltage output either in AC or DC or both which is sent to the connection switch network 16. By specifically configuring the connection switch network, the high voltage output can be supplied to the load through any of the load connection lines either directly or by way of the line driver circuit means 12. A power control circuit means 20 is under control of a program load and command 22 and is responsive to the sensing output of the current and voltage sensing network 14 to generate control signals for the high voltage circuit means 18 and the connection switch network 16. A battery or other DC power source 24 provides not only the operating power for various circuits and networks but also the power which is supplied to the load directly or the power which is to be converted by the high voltage circuit means before being supplied to the load. The connection switch network 16 can be constructed from mechanical switches, solid-state switches or a combination of these. The power control circuit means may include a combination of digital and analog hardware, operated by a digital controller which may be implemented using computer architecture with stored program software.

Figure 2:
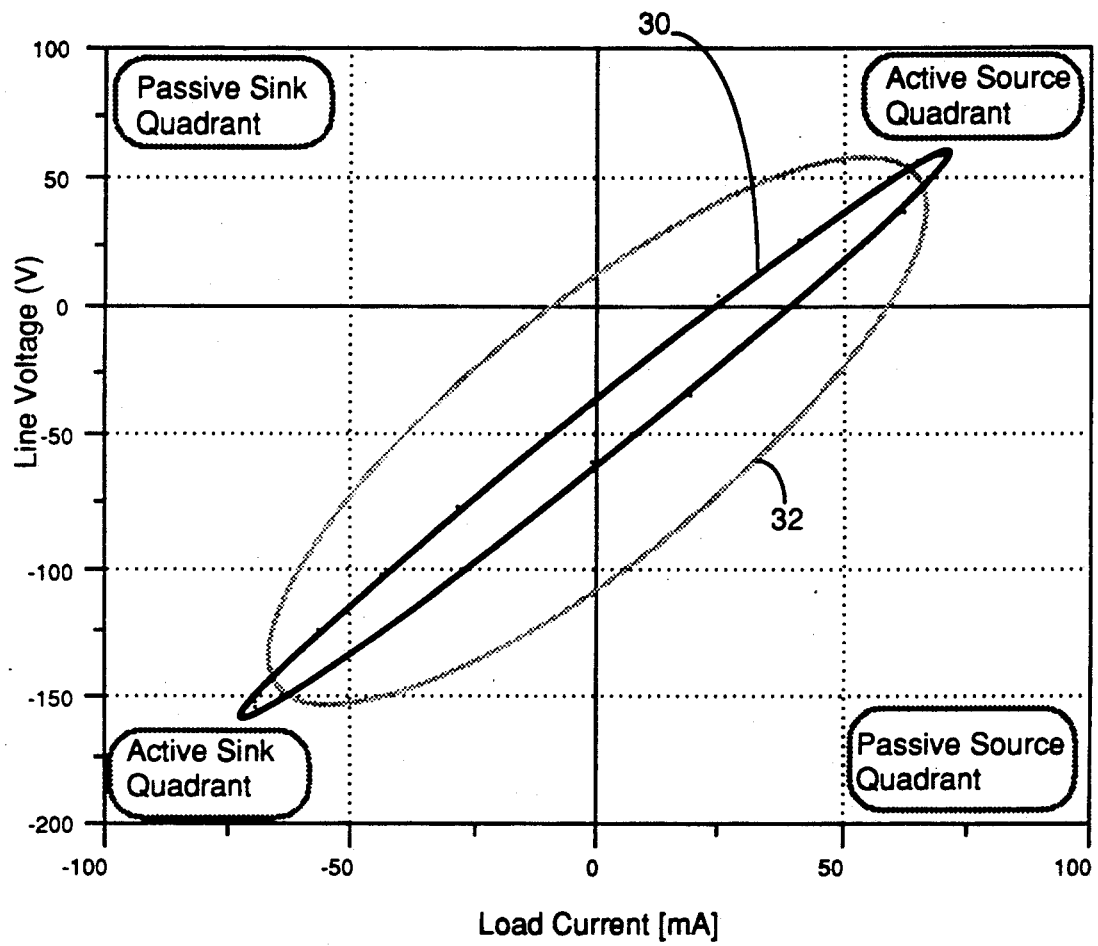
FIG. 2 shows diagrams of voltage-current characteristics of some typical loads.

In various areas, a high voltage converter may involve driving reactive loads in both negative and positive polarities, such that power must at some times be delivered to the load, but at other times must be discharged from the load. To cover all situations requires that the converter is able to operate in four distinct modes, or "quadrants", and is able to switch moderately quickly from any mode to any other mode. The four operating quadrants will here be called active source, passive source, active sink, and passive sink. They are shown on a voltage-current diagram in FIG. 2. In the figure, a graph 30 indicates the voltage-current characteristics of a standard load impedance in the telephone system as an example and chosen to be equivalent to 5 ringers in parallel, being driven by a voltage that is controlled to vary sinusoidally with time, superimposed on a DC voltage component. A telephone ringer draws an AC component of current but not a DC component. The evident elliptical shape of the voltage-current curve indicates that the load impedance in this example includes a reactive component. Owing to the existence of a DC component of voltage but not of current, the operating characteristic in this example enters three but not all of the quadrants. However, in cases where the load has a higher reactance or there is no DC superimposition, the operation of the high voltage converter could enter into all four quadrants in turn, as shown by a graph 32.

Figures 3, 6:
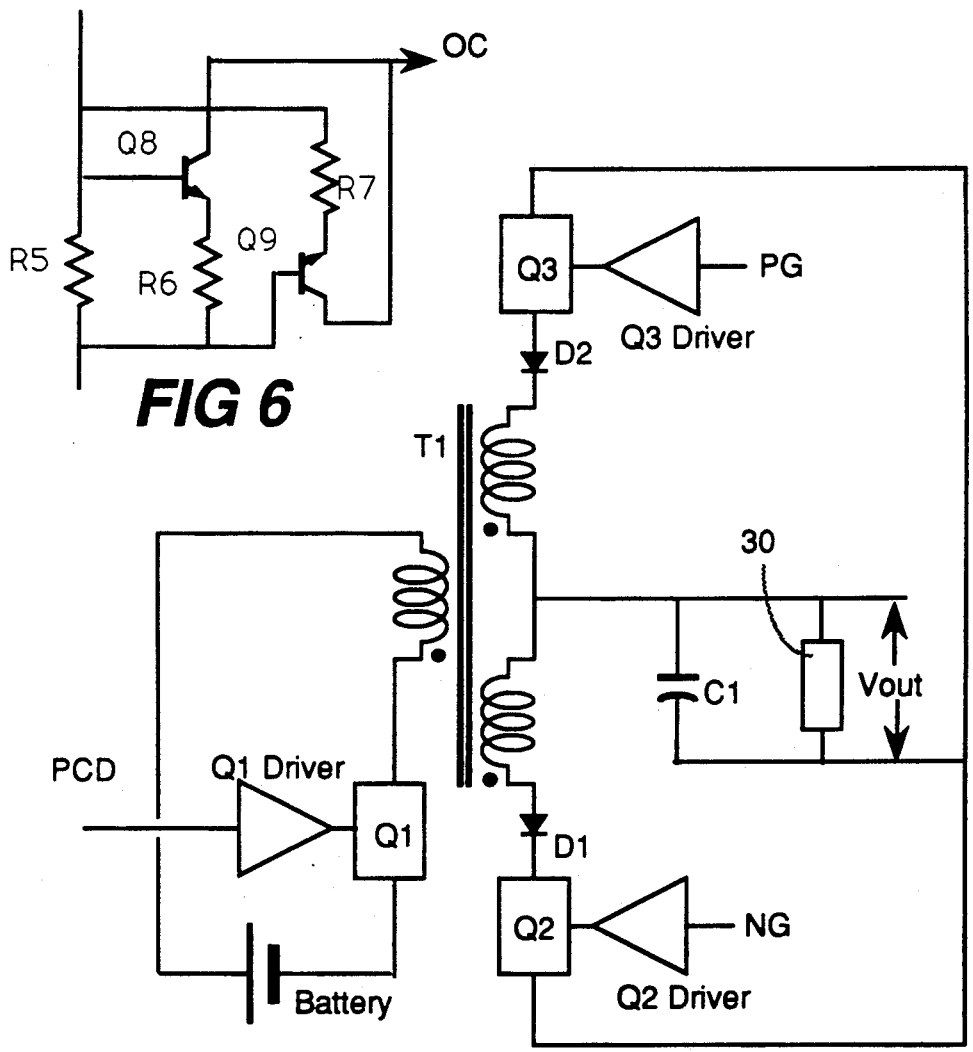
FIG. 3 is a schematic circuit diagram of the high voltage circuit means according to one embodiment of the invention.
FIG. 6 is a circuit diagram of the overcurrent detector circuit.

FIG. 3 illustrates schematically the high voltage circuit means according to one embodiment of the invention. For operation in the active source and active sink quadrants, transistor Q1 is switched on and off at a periodic high frequency by a pulsing control signal PCD. While Q1 is conducting, energy is transferred from the battery or other DC source to transformer T1. When Q1 turns off, T1 supplies energy to a reservoir capacitor C1 by the known principles of a flyback power converter. T1 is provided with two secondary windings, and correspondingly two rectifying diodes D1, D2. The high voltage circuit means is provided with two "grounding switches" consisting of transistors Q2 and Q3 with associated driver circuits. By selecting which of Q2 or Q3 is to be conducting by means of control signals PG and NG, the voltage provided to the load 30 may be chosen to be of either polarity. To minimize power losses, the transistor selected to conduct is made to be as fully conducting as is reasonably possible. The output power is controlled by varying the "ON" duty cycle of Q1. Control signals applied to the Q2 and Q3 driver circuits turn Q2 and Q3 on and off in desired manner so that required turns-on/off durations, timings, waveforms of the output, etc. can be controlled.

It should therefore be noted that unlike known DC converters, the high voltage circuit means of FIG. 3 utilizes the same transistors Q2 and Q3 for discharging power from the load in the operation of passive source or passive sink quadrants. In these operations, since no power is required to be taken from the battery, Q1 is held non-conducting. By making selected Q2 or Q3 conduct in a controlled manner, power can be discharged at the rate needed at any time to maintain the desired instantaneous voltage across the load of various impedance values.

In the field of telephony, the line driver circuit means 12 provides a variety of controlled DC power or normal voice or information carrying tone AC signal power at its output terminals. Ordinarily, the line driver circuit means contains multiple of ICs, e.g. op amps etc., and therefore the terminals VEE and VCC are provided for their operation. The terminal VCC is supplied with the regular operating power from the DC power supply 24. Various switch configurations of the connection switch means 16 can be chosen so that the terminal VEE is supplied with power either from the DC power source or the high voltage circuit means as a need for increased voltage or desired waveforms could arise.

The connections provided via the connection switch means determine the operating modes that can be provided. Table 1 below shows how the switches S1 through S8 shown in FIG. 1 allow various telephony operating modes to be provided. In the table, LDC and HVC stand for the line driver circuit and the high voltage circuit, e.g. the means shown in FIG. 1 by 12 and 18, respectively. Of course, there are many other possible combinations of these switches which are appropriate for other applications.

and a fraction k of the output voltage Vout of the high voltage circuit means, which is filtered by the low-pass filter to create an error voltage Verr. The low-pass filter is provided to remove high-frequency noise. The reference control circuit 40 can be made of hard-wired circuit or computer-type architecture, operated by stored program coding.

In addition to the Vout signal, the current and voltage sensing network 14 produces signals indicative of other conditions of the power supplied to the load, e.g. differential current etc. In telephony, the common mode current can be sensed here also. The high voltage circuit means can be provided with an overcurrent detector which generates an overcurrent trip signal 50 whose message 52 can be sent to the reference control circuits 40.

The power switching control circuit 44 determines in which quadrant of operation the power converter is required to be at any time, and applies control voltages to the transistor switches Q1, Q2, Q3 of the high voltage circuit means in such a way as to reduce the error voltage.

Table 2 below illustrates, in terms of six different operating situations, how the four quadrants can be identified by the sign of Vref and by the sign and magni-

TABLE 1

| # | S1 | S2 | S3 | S4 | S5 | S6 | S7 | S8 | HVC STATUS | TELEPHONY APPLICATION |
|---|----|----|----|----|----|----|----|----|----|----|
| 1 | C | X | C | C | — | — | — | — | inactive | Loop Idle or DC feed (LDC on Tip, Ring) |
| 2 | — | C | C | C | — | — | — | — | active | Loop Idle or DC feed (LDC on Tip, Ring) |
| 3 | C | — | — | C | X | — | — | — | inactive | Ground Start (Tip open, LDC on Ring) |
| 4 | C | — | — | C | C | — | — | — | active | Signalling on Tip (HVC on Tip, LDC on Ring) |
| 5 | X | — | — | — | C | — | — | — | active | Coin signalling on Tip (HVC on Tip, Ring open) |
| 6 | C | — | C | — | — | C | — | — | active | Signalling on Ring (HVC on Ring, LDC on Tip) |
| 7 | X | — | — | — | C | C | — | — | active | Simplex Coin signalling (HVC on both Tip & Ring) |
| 8 | X | — | — | — | C | — | — | C | active | Signalling on Tip (HVC on Tip, Gnd on Ring) |
| 9 | X | — | — | — | — | C | C | — | active | Signalling on Ring (HVC on Ring, Gnd on Tip) |

Definition of symbols:
— = open
C = closed
X = status unimportant (a "don't care" state).

When S1 is closed, the battery negative lead is connected to the negative supply point VEE of the line driver circuit means. In this situation, either S2 should be open, or if it is closed, the high voltage circuit means must be inactive. S1 may be opened, and S2 closed, to supply power to the loop via the high voltage circuit means. The usual reason for doing this is to provide a voltage different from that of the battery. The high voltage circuit means may be designed so that when inactive, it presents a high impedance at its output terminals. This will be assumed to be the case.

Figure 4:
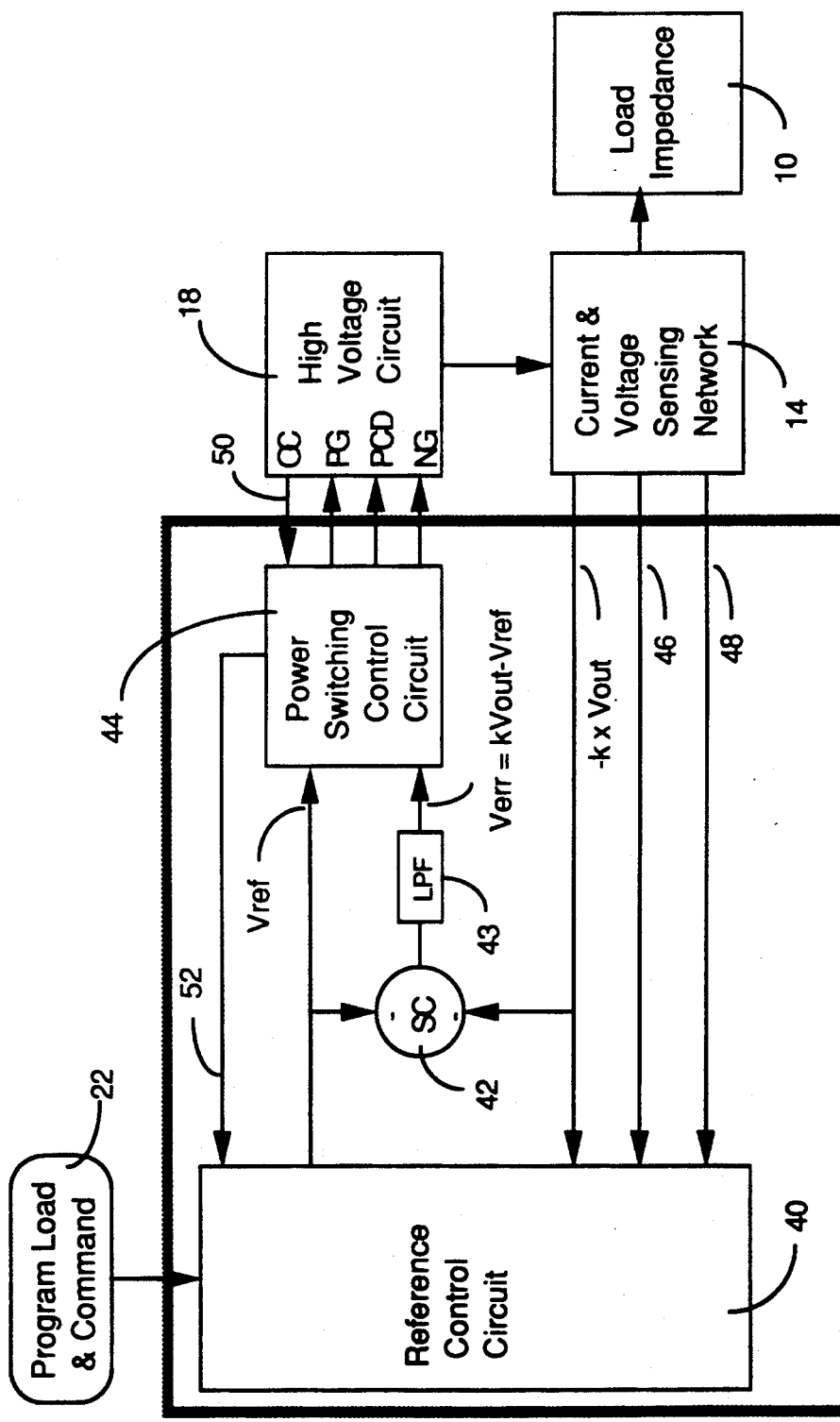
FIG. 4 is a block diagram of the power control circuit according to one embodiment of the invention.

FIG. 4 is a block circuit diagram of the power control circuit means 20 which includes a reference control circuit 40, a summing circuit 42, low-pass filter 43, and a power switching control circuit 44. Like numerals are used in the figure to indicate like elements shown in FIG. 1. The reference control circuit 40 generates a smooth analog reference voltage Vref that is a replica (on a reduced scale) of the loop powering voltage or signalling voltage that is to be generated. The summing circuit 42 generates a voltage difference between Vref tude of Verr. They define whether Q1 should be pulsed, and which of Q2 or Q3 should be turned on, and whether the status of Q1 or Q3 should be highly conductive, or conducting in a controlled manner in proportion to the magnitude of the error. The pulse duration applied to Q1 must never exceed a defined maximum value, in order to allow sufficient time for flyback, when the energy transferred into transformer T1 during the "on" period of Q1 is transferred to the load. For small errors, optional but preferred "hold zones" are defined in Table 2. The purpose of the hold zones is to avoid problems caused by finite turn-off times and finite turn-on times in switches Q2 and Q3. Otherwise, when a transition into an active quadrant occurs, there is a risk that the high-speed switching of Q1 starts while, for a short time (1) both Q2 and Q3 are conducting simultaneously, and (2) neither Q2 nor Q3 is conducting. Problem (1) would cause a short circuit and problem (2) an open circuit, in either case with risk of hardware damage.

TABLE 2

| Power Converter Situations (Inset) | | | Functions of Power Switching Control Circuit | | | |
|---|---|---|---|---|---|---|
| No | Sign of Reference | Sign (Magnitude) of Error # | Quadrant | NG (Q2) | PCD (Q1) | PG (Q3) |
| 1 | Negative | Negative | Passive Source | OFF | OFF | Variable |
| 2 | Negative | Positive (small) | Hold | Highly Conducting | OFF | OFF |
| 3 | Negative | Positive | Active Sink | Highly Conducting | Var. pulse | |
| 4 | Positive | Negative | Active Source | OFF | Var. pulse | Highly Conducting |
| 5 | Positive | Negative (small) | Hold | | OFF | |
| 6 | Positive | Positive | Passive Sink | Variable | OFF | OFF |

In the field of telephony as one of the preferred embodiments of the invention, for supplying controlled DC power to the telephone line, the specific function of the reference control circuit in steady conditions, such as in the "idle" state and at other times, may be to provide a constant reference voltage. This may not be the case during or following transient changes. Also, in many situations the reference control circuit must provide a time-varying reference voltage. For example, Integrated Services Digital Network (ISDN) operation may require the application of time-varying (ramped) "sealing current" power to the loop. In the case of high-voltage signalling, it is usually required that the reference control circuit provides a time-varying reference voltage.

In both DC powering and high-voltage signalling, the reference control circuit may be required to make adjustments to the reference voltage in response to changes in the line currents—either the loop (differential) current, or the longitudinal (common mode) current, or to the current in one or the other of the load connection lines. The purpose of such adjustments may include limiting the current in accordance with a defined standard of operation, reducing heat dissipation within the line circuit, reducing potential hazard to personnel, or reducing any risk of damage to the components of high voltage circuit means due to overcurrent caused by abnormal loop conditions, such as ground faults or lightning. In an event that the high voltage circuit means shuts down entirely due to an overcurrent, one of the functions of the reference control circuit would be to analyze the sensing data in relation to the function being performed, then either re-enable the high voltage circuit means, or leave it disabled.

Figure 5:
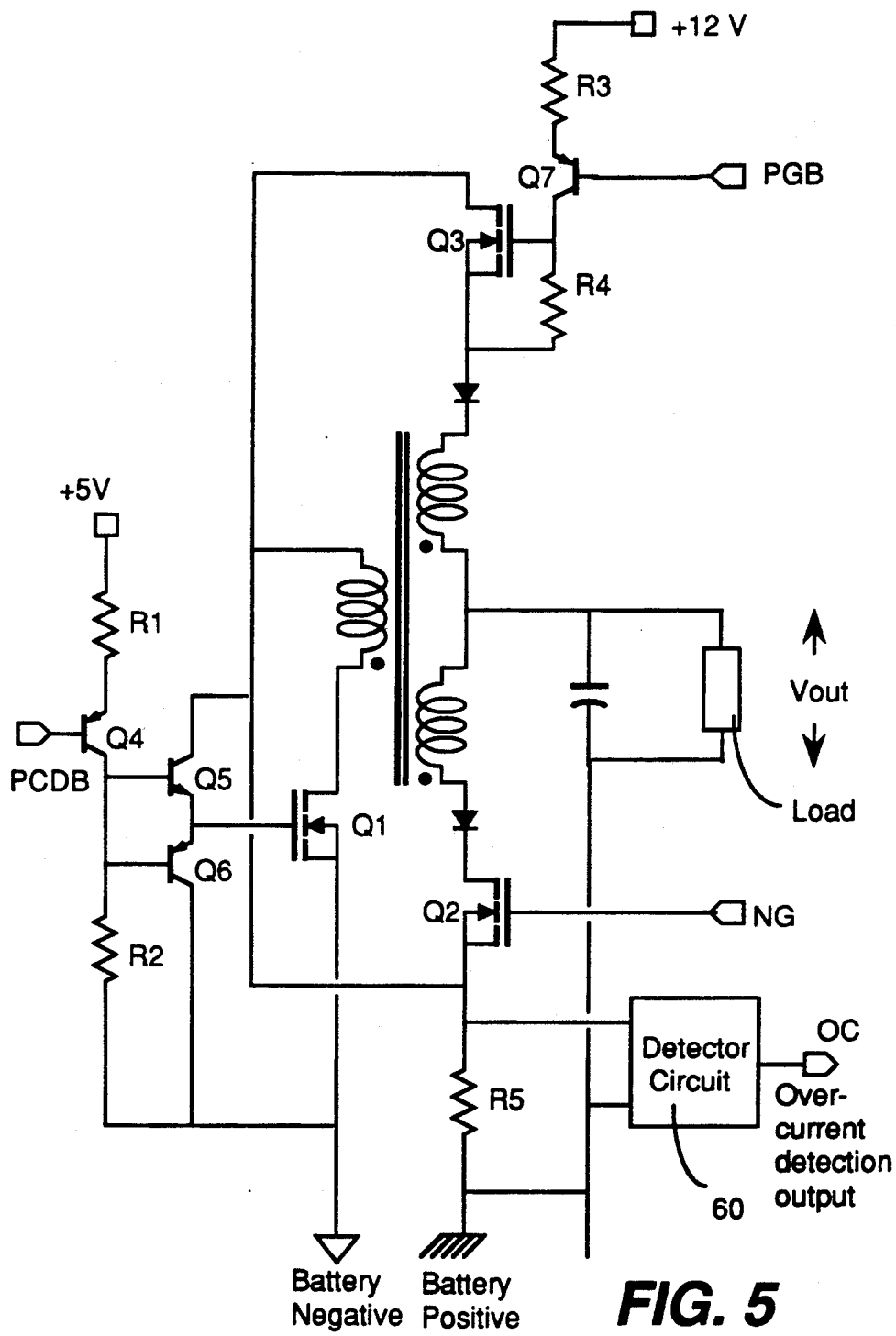
FIG. 5 is a schematic circuit diagram of the high voltage circuit means according to another embodiment of the invention.

FIG. 5 shows another embodiment of the high voltage circuit means. Transistors Q1, Q2 and Q3 are power-switching MOS transistors. In addition to the other essential circuit elements already shown in FIG. 3, elements R1, R2, Q4, Q5 and Q6 provide level shifting between the control signal levels provided by the power switch control circuit, and levels close to battery negative voltage. Additionally, they are able to drive Q1 on and off at high speeds, as required for efficient power conversion. Owing to level inversion by Q4, the required logical control signal is not PCD as in FIG. 3, but the inverse, here labelled PCDB. In this example, Q2 is driven directly by the control signals from the power switch control circuit. Typically, the levels of these signals would be less than 1 V (off) and up to about 10 V (on), so that Q2 can be a power MOS transistor of a standard type, yet have a low resistance to current flow when fully "on".

Unlike Q2, Q3 is required to be able to control conduction at negative voltages. However, for convenience Q3 is chosen to be of similar type to Q2, (n-channel MOS), and is arranged to control negative voltages by grounding its drain contact instead of the source contact as for Q2. This means that the control gate of Q3 must follow close to the high negative voltage that can exist on the source contact of Q3. Elements R3, R4 and Q7 provide level shifting to control the gate voltage of Q3 under all conditions, when driven by control signal PGB, the inverted form of PG. In an alternative embodiment, high voltages on the control gate of Q3 could be avoided by choosing Q3 to be a p-channel MOS, with its source grounded. If, in addition, Q3 were chosen to be normally-on (depletion type) MOS, its gate could be driven directly by positive control signals.

Also shown in FIG. 5 is resistor R5, which has low ohmic value (typically about 1 ohm) and a detector circuit 60, which monitors the voltage drop across R5 to provide fast detection of excessive current in either polarity. This could be caused by sudden changes in the line conditions, either being normal conditions (e.g. ringing answer) or abnormal conditions (e.g. line surges). By arranging that the power switch control circuit then turns off Q1, Q2 and Q3, the high voltage circuit means can be disabled within a very short time, preventing possible damage to the components of the high voltage circuit means.

FIG. 6 is a practical implementation of the detector circuit 60. It consists of R6 and Q8, which respond to one polarity of excessive current, (causing positive voltage input to the detector) and R7 and Q9, which respond to the opposite polarity of current. The result is that an excessive current in either polarity through R5 causes a warning current in one polarity to appear at the detector output point, labelled OC.

Figure 7:
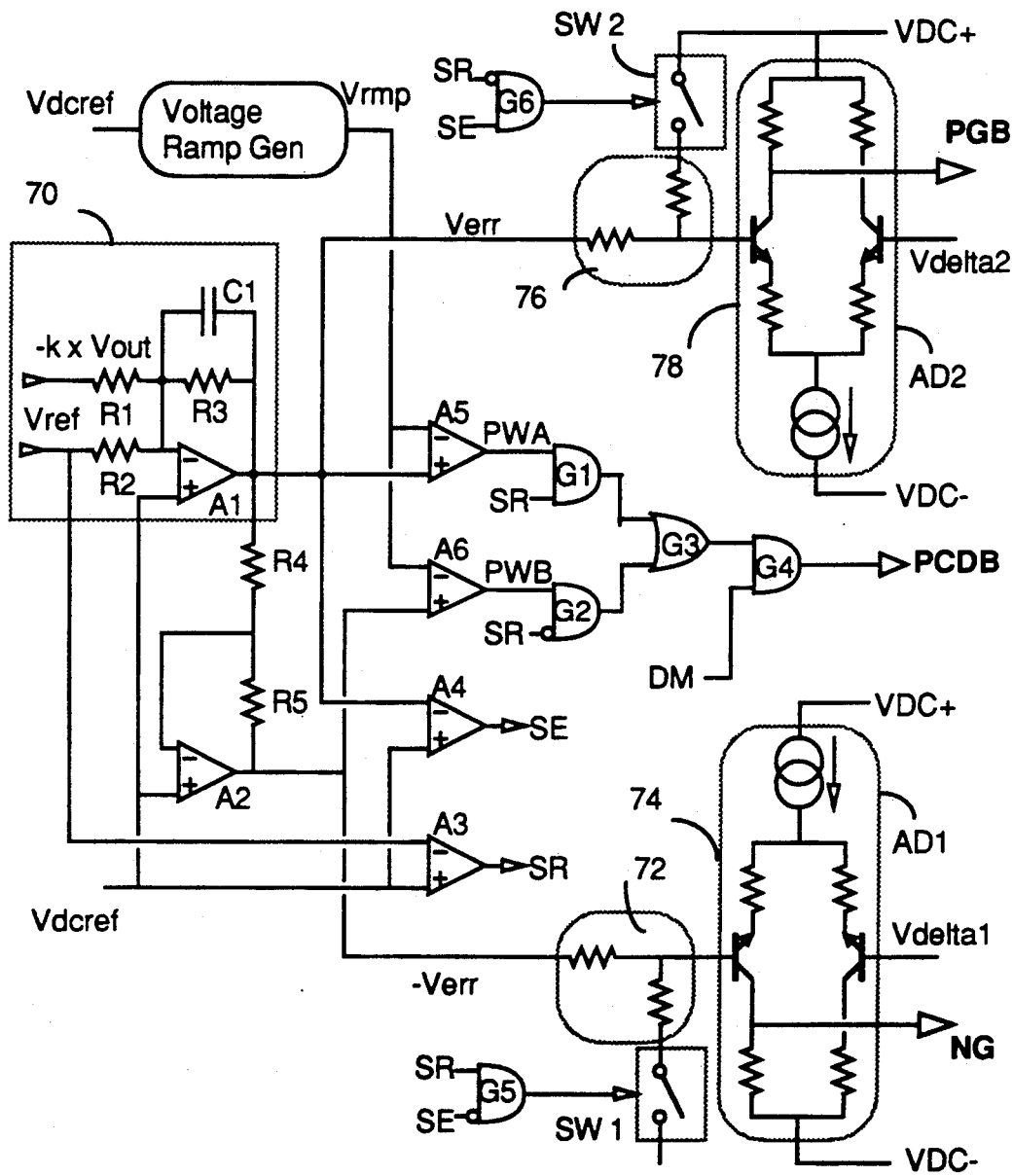
FIG. 7 is a circuit diagram of the power switching control circuit according to one embodiment of the invention.

FIG. 7 shows a possible implementation of the power switching control circuit. Elements R1 to R3, C1 and A1 within the shaded boundary 70 provide the functions of the summing circuit 42 and low-pass filter 43 in FIG. 4, producing the error voltage Verr. Elements R4, R5 and A2 generate −Verr (inverted error). Amplifiers A3 and A4 operate as comparators, generating digital signals SR and SE, respectively, defining the sign of the reference and the sign of the error. Amplifiers A5 and A6 operate as fast comparators, respectively, comparing Verr and −Verr against a periodic voltage ramp Vrmp, and thereby producing pulse-width modulated digital signals PWA and PWB. According to the status of SR, one or other of logical AND gates G1 or G2 is enabled to pass signal PCDB. G4 also receives a logically-unconditional (clock) signal DM, which constrains the pulse width to a chosen maximum value. This ensures that Q1 in the high voltage circuit means is always switched off for a sufficient time to complete the flyback portion of its switching cycle, for every required voltage and load impedance combination.

Also in FIG. 7, gate G5, together with switch SW1, resistor network 72 and differential amplifier 74, provide the voltage levels of NG to control the required states of Q2, namely being "off", or "on" with a conduction proportional to Verr, or "on" in a heavily-conducting state. Similarly, gate G6, together with switch SW2, resistor network 76 and differential amplifier 78 provide the required levels of PGB, controlling the states of Q3.

Figure 8:
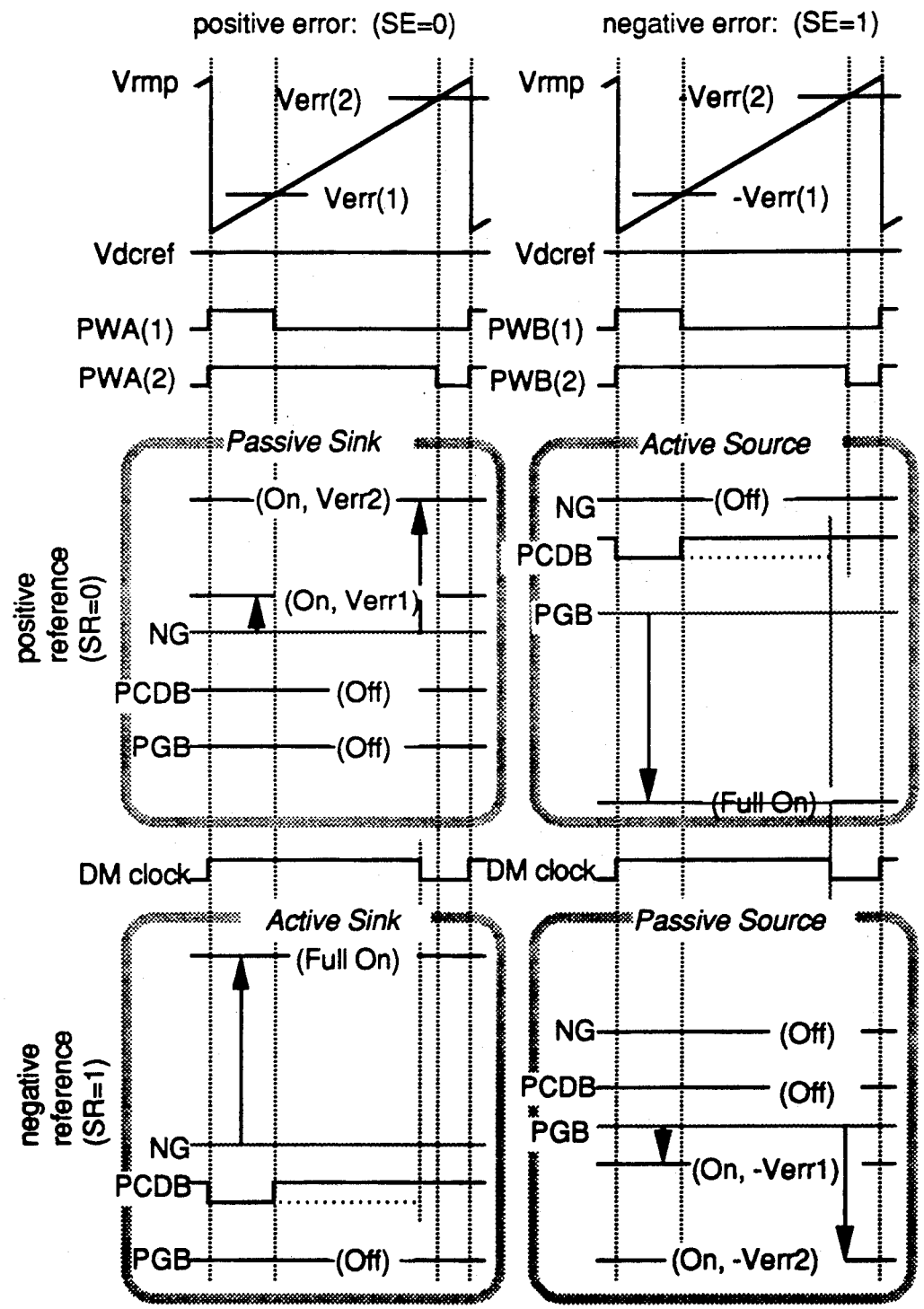
FIG. 8 shows power switching control circuit output signals.

In FIG. 8 it can be seen that the ramp Vrmp commences at a voltage that is offset from the comparator reference Vdcref by a small amount. When the error magnitude is smaller than this amount, no pulse is produced at PCDB. This aids in creating the "hold zones" shown in FIG. 5.

Referring back to a FIG. 7, the reference voltage Vdelta1 should be set to a level more negative than Vdcref, so that for small error magnitudes, the NG level is clamped at VDC−. Similarly, the reference voltage Vdelta2 should be set to a level that is more positive than Vdcref, so that for small error magnitudes the PGB level is clamped at VDC+. This clamping of NG and PGB at small error magnitude, together with the offset in the ramp voltage as mentioned above, may incidentally cause the formation of hold zones in the passive quadrants. However, the purpose of the offsets is to ensure that for sufficiently small errors, the discharge of energy from the load can be effectively prevented.

FIG. 8 further illustrates the formation of PWA and PWB from both smaller and larger examples of the error voltage, respectively labelled Verr(1) and Verr(2) and the form of the control signals NG, PCDB and PGB, for the large and small error examples Verr(1) and Verr(2).

Figure 9A:
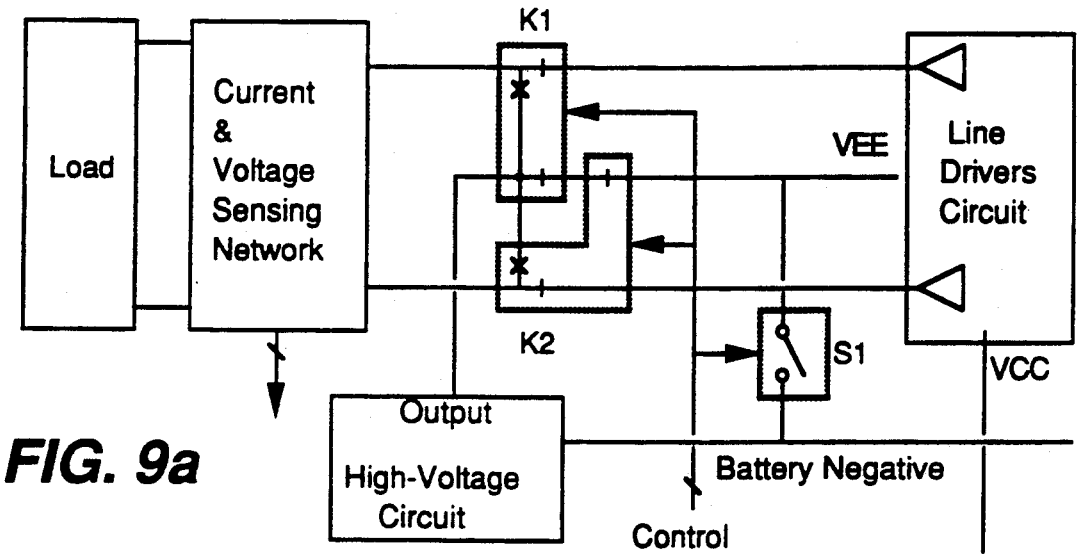
FIG. 9a and 9b are schematic block diagrams showing switch configurations according to two embodiments of the invention.
Figure 9B:
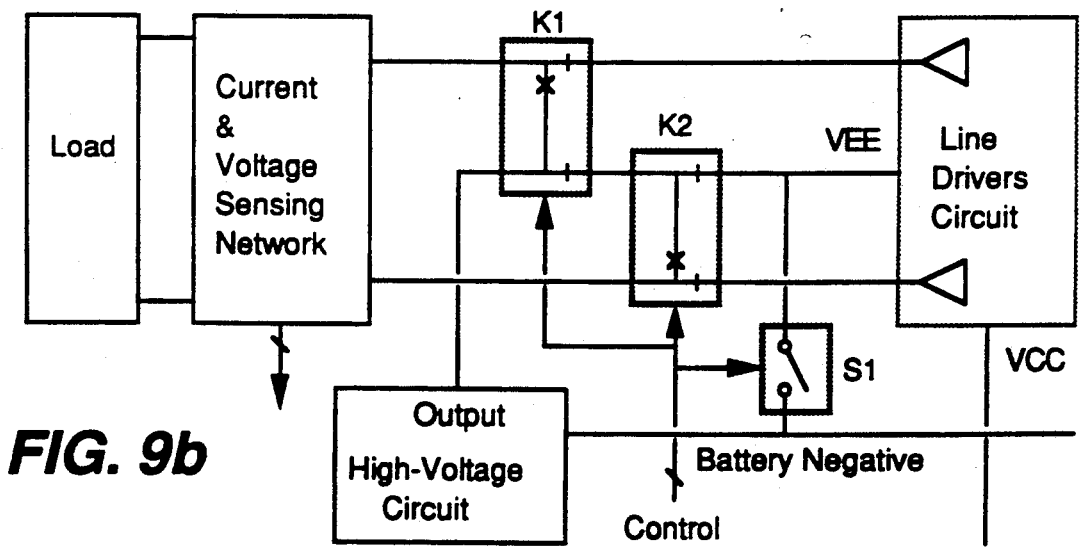

FIGS. 9a and 9b illustrate possible implementations of the connection switches network. In both figures, S1 is a solid-state switch, providing the same functions as S1 in FIG. 1. In general, solid-state switches are convenient when the closed-circuit resistance is not required to be very low. K1 and K2 are metallic relays. In FIG. 9a, a symmetrical configuration of K1 and K2 provides signalling functions 1, 2, 3, 4, 5, and 7 as listed in Table 1, but excludes normal coin signalling, listed as number 6, because it is not possible to open-circuit the Ring lead while the high voltage circuit means is active. In FIG. 9b, relays K1 and K2 are connected in an offset manner, that provides the functions 1, 2, 3, 4, 5, and 6, but not the alternate form of coin signalling, listed as number 7.

The optional functions of S7 and S8 in FIG. 1, listed as applications 8 and 9 in Table 1, are not provided in either of the above configurations. Table 3 shows the available operating modes and corresponding switch and relay states for both configurations.

TABLE 3

| # | FIG. 9a | | | | FIG. 9b | | | | TELEPHONY APPLICATION |
|---|---|---|---|---|---|---|---|---|---|
| | S1 | K1 | K2 | HVC | S1 | K1 | K2 | HVC | |
| 1 | C | — | — | inactive | C | — | — | inactive | Loop Idle or DC feed (LDC on Tip, Ring) |
| 2 | — | — | — | active | — | — | — | active | Loop Idle or DC feed (LDC on Tip, Ring) |
| 3 | C | E | — | inactive | C | E | — | inactive | Ground Start (Tip open, LDC on Ring) |
| 4 | C | E | — | active | C | E | — | active | Signalling on Tip (HVC on Tip, LDC on Ring) |
| 5 | Not available | | | | C | E | E | active | Coin signalling on Tip (HVC on Tip, Ring open) |
| 6 | C | — | E | active | C | — | E | active | Signalling on Ring (HVC on Ring, LDC on Tip) |
| 7 | C | E | E | active | Not available | | | | Simplex Coin signalling (HVC on both Tip & Ring) |

Definition of symbols:
— = switch S1 open, or relay Kn not energized
C = switch S1 closed
E = relay Kn energized

We claim:

1. A high voltage converter for providing a power to a load from a DC voltage source, by load connection lines comprising:
 line driver circuit means to be connected to said DC voltage source for providing a line drive outoput;
 high voltage circuit means to be connected to said DC voltage source for providing a high voltage output; and
 connection switch means for selectively connecting said line driver circuit means and said high voltage circuit means to said load connection lines for providing said line drive output, said high voltage output or a combination thereof,
 said high voltage circuit means in turn comprising:
 a flyback transformer having a primary winding and two secondary windings;
 a primary transistor switch connected to said primary winding for supplying the pulsed power thereto from said DC voltage source in a controlled pulsing manner;
 a secondary transistor switch and diode combination connected to each of said two secondary windings for controlling the flow of the power generated therein as the result of the power supplied to said primary winding; and
 power control circuit means for providing transistor control signals to said transistor switches and switch control signals to said connection switch means in that one of said transistor control signals is a high frequency pulsing signal and is applied to said primary transistor switch to turn the same to conducting so that said pulsed power is supplied to said primary winding in the controlled pulsing manner, the others of said transistor control signals are applied to said secondary transistor switches in order to turn on one of the two secondary transistors at one time in a controlled manner so as to control the flow of power between said high voltage circuit means and said load connection lines.

2. The high voltage converter, according to claim 1, wherein:
the conduction of said conducting secondary transistor switches is variable.

3. The high voltage converter according to claim 2, wherein:
said line drive circuit means is connected to said connection switch means which in turn is connected to the load connection line;
said power control circuit means further provides switch control signals; and
said connection switch means comprise a plurality of on/off switches operative in response to said switch control signals.

4. The high voltage converter, according to claim 3, wherein said primary transistor switch and said primary winding are connected in series to said DC voltage source, and said secondary transistor switches and diodes and said secondary windings are connected in a loop.

5. The high voltage converter to claim 4, wherein a capacitor is provided between a point connecting said two secondary windings and one of the two polarities of said DC voltage source, said point being further connected said connection switch means for providing said high voltage output thereto.

6. The high voltage converter, according to claim 5, wherein said high voltage circuit means further comprises an overcurrent detection means for detecting an overcurrent which may flow out of said DC voltage source.

7. The high voltage converter, according to claim 6, further comprising a programmable load and command means connected to said power control circuit means for providing programmed reference signals and said power control circuit means further comprise error detecting means for generating error signals in response to said high voltage output with respect to said programmed reference signals.

8. The high voltage converter, according to claim 3, wherein said connection switch means comprise at least two sets of metallic relay switches and a solid-state switch, all operative in response to said switch control signals.

9. The high voltage converter, according to claim 8, wherein said two sets of metallic relay switches are arranged in an offset manner.

10. The high voltage converter, according to claim 9, further comprising a programmable load and command means connected to said power control circuit means for providing programmed reference signals and said power control circuit means further comprise error detecting means for generating error signals in response to said high voltage output with respect to said programmed reference signals.

11. The high voltage converter, according to claim 2, further comprising a programmable load and command means connected to said power control circuit means for providing programmed reference signals and said power control circuit means further comprise error detecting means for generating error signals in response to said high voltage output with respect to said programmed reference signals.

* * * * *